(12) United States Patent
Matsushita et al.

(10) Patent No.: US 6,411,325 B1
(45) Date of Patent: Jun. 25, 2002

(54) OPTICAL UNIT, AND ELECTROPHOTOGRAPHIC RECORDING DEVICE HAVING SAME

(75) Inventors: Yukihiro Matsushita; Takao Sugano, both of Kawasaki (JP)

(73) Assignee: Fujitsu Limited Kawasaki (JP)

( * ) Notice: Subject to any disclaimer, the term of this patent is extended or adjusted under 35 U.S.C. 154(b) by 0 days.

(21) Appl. No.: 09/705,751

(22) Filed: Nov. 6, 2000

(30) Foreign Application Priority Data

Feb. 2, 2000 (JP) ........................................ 2000-025107

(51) Int. Cl.[7] .......................... B41J 2/385; G03G 13/04
(52) U.S. Cl. ...................... 347/257; 347/134; 347/137; 347/258; 359/819
(58) Field of Search ................................ 347/134, 137, 347/138, 242, 245, 257, 258; 359/363, 362, 811, 819, 823

(56) References Cited

U.S. PATENT DOCUMENTS 5,255,115 A * 10/1993 Kikuchi ..................... 347/257
5,331,343 A * 7/1994 Ono et al. .................. 347/257
5,673,136 A   9/1997 Inoue et al.

FOREIGN PATENT DOCUMENTS

| JP | 63-170612 | 7/1988 |
| JP | 7-199100 | 8/1995 |
| JP | 8-234125 | 9/1996 |
| JP | 9-105878 | 4/1997 |

* cited by examiner

Primary Examiner—Susan S. Y. Lee
(74) Attorney, Agent, or Firm—Armstrong, Westerman & Hattori, LLP.

(57) ABSTRACT

It is an exemplified object of the present invention to provide an optical unit that can easily and inexpensively align an optical axis of the lens and a beam from a light source during continuous operation, and to provide an electrophotographic recording device that has such an optical unit and thereby can form a high-quality latent image on a photosensitive body. The optical unit as an exemplified embodiment of the present invention is configured to have the optical axis of the lens and a mounting position thereof substantially aligned with each other, and thus reduce or eliminate a misalignment of the optical axis with the light source and lens even if temperature rises.

17 Claims, 20 Drawing Sheets

OPTICAL UNIT, AND ELECTROPHOTOGRAPHIC RECORDING DEVICE HAVING SAME

BACKGROUND OF THE INVENTION

The present invention relates generally to optical systems, and more particularly to an optical unit that scans a beam radiated from a light source in a predetermined direction. The present invention lends itself, for example, to a scanning optical system for an electrophotographic recording device, and optical disk unit.

The "electrophotographic recording device" by which we mean is a recording device employing the Carlson process as described in U.S. Pat. No. 2,297,691, and denotes a nonimpact image-forming device that provides a recording by depositing a developing agent as a recording material on a recordable medium (e.g., printing paper, and OHP film). The electrophotographic recording device is typified by a laser printer, and is broadly applicable not only to a discrete printer, but also generally to an apparatus having a printing function such as a photocopier and a facsimile unit. The scanning optical system is typically a unit that includes a variety of light sources (e.g., a semiconductor laser, a He—Ne gas laser, a Ar gas laser, and a He—Cd gas laser), a collimating lens, a rotating mirror, an f-è lens, a cylinder lens, etc., serving to form a desired latent image on a photosensitive body.

A laser printer as an example of the electrophotographic recording device has characteristics such as an excellent operability and cost efficiency, and high-quality image formation. In addition, due to a reduced vibration and noise during printing, the use of the laser printer for computer's output devices, facsimile units, photocopiers, etc. has spread steadily, with the recent development of office automation.

The laser printer generally includes a pre-charger, a photosensitive body (e.g., drum and belt), an optical unit, a development device, a transfer device, and a fixing device. The pre-charger electrifies the photosensitive body uniformly (e.g., at −600V). The optical unit forms a latent image by exposure to light on the photosensitive body charged by the pre-charger. To be more specific, the optical unit irradiates a light from the light source on an area, and varies a potential on the irradiated area, for example, to −50V or so, to form an electrostatic latent image on the photosensitive body. The latent image is thereafter visualized into a toner image by the development device. The transfer device, which employs a corona charger for example, transfers the toner image onto the recordable medium or printing paper. The fixing device fixes the toner image that has been transferred on the printing paper, and the printing paper is then ejected.

The optical unit typically includes a light source section, a polygon mirror (rotating mirror), a lens system comprised of an f-è lens and a cylinder lens, a print start detector section (hereinafter referred to as BD sensor), and other necessary mirrors. These components are secured with a mounting part on a bottom surface of a housing, which is sometimes called optical box or optical base.

The light source section includes a light source, a collimating lens, and optionally a cylindrical lens. As the light source, for example, a semiconductor laser is used. The semiconductor laser irradiates a laser beam at a spreading angle from a point light source, so that the longer the radiating distance is, the wider the laser beam spreads out from the light source as a vertex of cone. The collimating lens, which is located near the light source, collimates the laser beam to make a parallel beam. The cylindrical lens subsequently forms the beam that has passed through the collimating lens into a beam converging in one direction. In order to achieve a large exposure area, high quality and fast writing action onto the photosensitive body, the number of semiconductor lasers to be provided is plural, and the equal number of collimating lenses, etc. is provided accordingly.

The polygon mirror, which is a deflector taking on a rotary polyhedron mirror, changes a laser beam traveling direction, and lets the laser beam scan. The lens system is provided to correct curvature, and to ensure constant velocity. The BD sensor detects a laser beam through a mirror, and provides timing for a print start.

In operation of the optical unit, the laser beam irradiated from the light source is collimated via the collimating lens. Thereafter, the laser beam is reflected by the rapidly rotating polygon mirror, and passes through the lens system, to correct curvature. The laser beam that has passed through the f-è lens passes through the cylinder lens while being detected by the BD sensor to provide print timing, scans the photosensitive body for a desired area to be exposed, and forms a latent image.

In order to securely form a high-quality latent image on the photosensitive body, the laser beam needs aligning with each optical axis of the collimating lens, the f-è lens, and the cylinder lens. A misalignment between the beam and each optical axis would lead to a shift of the beam in a sub-scanning direction. The shift of the beam in the sub-scanning direction would make the BD sensor unable to detect the beam, and result in varied pitches between the beams when the light source is made up of two beams. If the BD sensor cannot detect the beam, the print timing cannot be provided, and thus printing operations become impossible. Moreover, the varied pitches between the beams would, for example, thicken contours of the latent image, and deteriorate a print quality.

However, a conventional optical unit disadvantageously undergoes a thermal expansion by heat produced in the optical unit and other printer components during continuous operations of a light source, a lens system, or the like, and causes a misalignment between the beam and each optical axis. The heat is derived from heat sources such as a fixing device, a motor used for conveying a recordable medium, heat producing printed boards of various kinds, and a motor used for rotating a polygon mirror. Resultantly, temperature in the optical unit rises from room temperature (approximately 20° C.) to approximately 60° C., and the components in the optical unit thermally expand. Since the light source section and the lens system are different from each other in thermal expansion amounts due to differences in materials and shapes, the beam and each optical axis in the optical unit, which are properly aligned with each other in an initial state, would become misaligned as operations proceed. The present inventors and other colleagues, having assiduously considered a method of correcting the misalignment between the beam and each optical axis, have consequently put a focus on a method of mounting components in the conventional optical unit.

Referring now to FIG. 13, a description will be given more specifically of a structure of the conventional optical unit. FIG. 13 is a schematic perspective view showing main components in the optical unit 100B. As shown in the drawing, the optical unit 100B includes a light source section 10B, a polygon mirror 20B, an f-è lens 30B, and a cylinder lens 40B. The optical unit 100B is optically connected with a photosensitive drum 202. These components 10B, 30B, and 40B are respectively mounted on a base or housing 70B via mounting parts 102B through 106B. The optical unit 100B has a two-beam structure in which two light sources are provided.

A description will now be given of how the components 10B, 30B, and 40B are mounted with reference to FIGS. 14 through 16. FIG. 14 is a front view, side view, and exploded side view of the light source section 10B as viewed from a direction C in FIG. 13. FIG. 15 is a front view of the f-è lens 30B as viewed from a direction A in FIG. 13. FIG. 16 is a front view of the cylinder lens 40B as viewed from the direction A in FIG. 13. A dash-dot line in each figure represents the optical axes.

As shown in FIG. 14, the light source section 10B includes a semiconductor laser 12B as a light source, a collimating lens 11B that collimates a laser light irradiating at a spreading angle, a lens barrel 13B that holds the collimating lens 11B, and a block 15B that fastens the lens barrel 13B. A mounting surface $f_d$ between the light source section 10B and the mounting part 102B is located at a bottom portion of the light source section 10B, and positioned below the optical axis of the collimating lens 11B. The collimating lens 11B thermally expands from the mounting surface $f_d$ in a direction E (vertical direction, namely, sub-scanning direction), and thus the optical axis OA1 is shifted in the sub-scanning direction after the thermal expansion.

Similarly, referring to FIGS. 15 and 16, the f-è lens 30B and the cylinder lens 40B respectively include mounting surfaces $f_e$ and $f_f$ at each bottom portion. Therefore, when the lenses 30B and 40B thermally expand from the mounting surfaces $f_e$ and $f_f$ in a direction E, the respective optical axes OA2 and OA3 are shifted in the sub-scanning direction.

If the shift direction of the laser beam is represented with a main scanning direction and a sub-scanning direction, the main scanning direction corresponds to a circumferential direction of the polygon mirror, and the sub-scanning direction to a height direction thereof. Compared with a permissible shift amount in the main scanning direction, the permissible shift amount in the sub-scanning direction is much smaller. The laser beam, even if shifted in the main scanning direction, may be corrected for the deviation in the main scanning direction by adjusting a print timing with the rotating polygon mirror and the BD sensor. In contrast, the beam that has been shifted in the sub-scanning direction may fall on the polygon mirror, but possibly does not appropriately come in the mirrors and lenses that follow, and thus cannot be detected by the BD sensor. Consequently, print timing could not be provided properly, and printing function would be disabled. In addition, the optical unit in which two semiconductor lasers are provided would vary pitches between the beams, thicken contours of the latent image, and deteriorate a print quality. Therefore, the shift of the optical axis in the sub-scanning direction in the optical unit including a plurality of light sources is preferably smaller than that in the optical unit including one light source.

Referring now to FIGS. 18 and 19, a description will be given of a shift of an optical axis produced in a conventional one-beam type optical unit 100C. FIG. 18 is a schematic perspective view of the optical unit 100C. The optical unit 100C includes, like the embodiment illustrated in FIG. 13, a light source section 10C, a polygon mirror 20C, an f-è lens 30C, and a cylinder lens 40C. FIG. 19 is a partially enlarged perspective view of the optical unit 100C for explaining a shift of the optical axis of the f-è lens 30C that has thermally been expanded. As shown in FIG. 19, the lens 30C thermally expands from an interface surface (mounting surface $f_g$) in a vertical direction (indicated by an arrow E, i.e., sub-scanning direction), and an optical axis position OA4' after the thermal expansion is shifted from the original optical axis position OA4 in the direction E.

On the other hand, in order to avoid the misalignment due to the thermal expansion between the beam and the optical axes, it is also a conceivable idea to provide a cooler that cools down the inside of the optical unit, or an adjustment means for detecting and correcting the shift in the collimating lens in the sub-scanning direction, but this would unfavorably increase the device's complexity and manufacturing cost.

BRIEF SUMMARY OF THE INVENTION

Therefore, it is an exemplified general object of the present invention to provide a novel and useful optical unit, and electrophotographic recording device having the same, in which the above disadvantages are eliminated.

Another exemplified and more specific object of the present invention is to provide an optical unit that can align optical axes of lenses with a beam from a light source simply and inexpensively.

Still another exemplified object of the present invention is to provide an electrophotographic recording device that includes the above optical unit and thus can form a high quality latent image on a photosensitive body.

In order to achieve the above objects, an optical unit according to one exemplified embodiment of the present invention comprises a base, at least one lens that is disposed on a light path of a beam emitted from a light source, and a mounting part that mounts the lens on the base, and a mounting position between the mounting part and the lens is substantially aligned with an optical axis in a sub-scanning direction of the lens. According to this optical unit, since the lens may thermally expand more mainly above the mounting position, the optical axis on the mounting position, if low in thermal expansion coefficient, is shifted less from the original position.

An optical unit according to another exemplified embodiment of the present invention comprises a base, a collimating lens that collimates a beam from a light source; a scanning lens that corrects a curvature of the beam that has passed through the collimating lens, and a mounting part that mounts the collimating lens and the scanning lens on the base, and a mounting position between the mounting part and at least one of the collimating lens and the scanning lens is substantially aligned with an optical axis in a sub-scanning direction of the at least one lens. According to this optical unit, since the at least one lens may thermally expand more mainly above the mounting position, the optical axis on the mounting position, if low in thermal expansion coefficient, is also shifted less from the original position.

An optical unit according to still another exemplified embodiment of the present invention comprises a base, a collimating lens that collimates a beam from a light source; a scanning lens that corrects a curvature of the beam that has passed through the collimating lens, a first mounting part that mounts the collimating lens on the base, and a second mounting part that mounts the scanning lens on the base, and a first mounting position between the first mounting part and the collimating lens, and a second mounting position between the second mounting part and the scanning lens are disposed in a place substantially equidistant from the base. According to this optical unit, if the first and second mounting parts have the same thermal expansion coefficient, the optical axis of each lens is shifted less.

An electrophotographic recording device as one exemplified embodiment of the present invention comprises a photosensitive body, a pre-charger that electrifies the photosensitive body, the above optical unit that exposes the photosensitive body and forms a latent image thereon, a development device that visualizes the latent image into a toner image with a developing agent, a transfer device that transfers the toner image onto a recordable medium, and a fixing device that fixes the toner image on the recordable medium. This electrophotographic recording device has the same effect as the above optical unit.

In addition, an optical unit according to still another exemplified embodiment of the present invention comprises a base, at least one lens that is disposed on a light path of a beam emitted from a light source; and a mounting part that mounts the lens on the base, and a mounting position between the mounting part and the lens is substantially aligned with a position on the light path of the beam. Moreover, the above lens may have asymmetrical top and bottom lens surfaces. According to this optical unit, even if the lens has asymmetrical top and bottom lens surfaces, the same effect as the above optical unit may be produced.

Other objects and further features of the present invention will become readily apparent from the following description of the embodiments with reference to accompanying drawings.

DETAILED DESCRIPTION OF INVENTION

Figure 1:
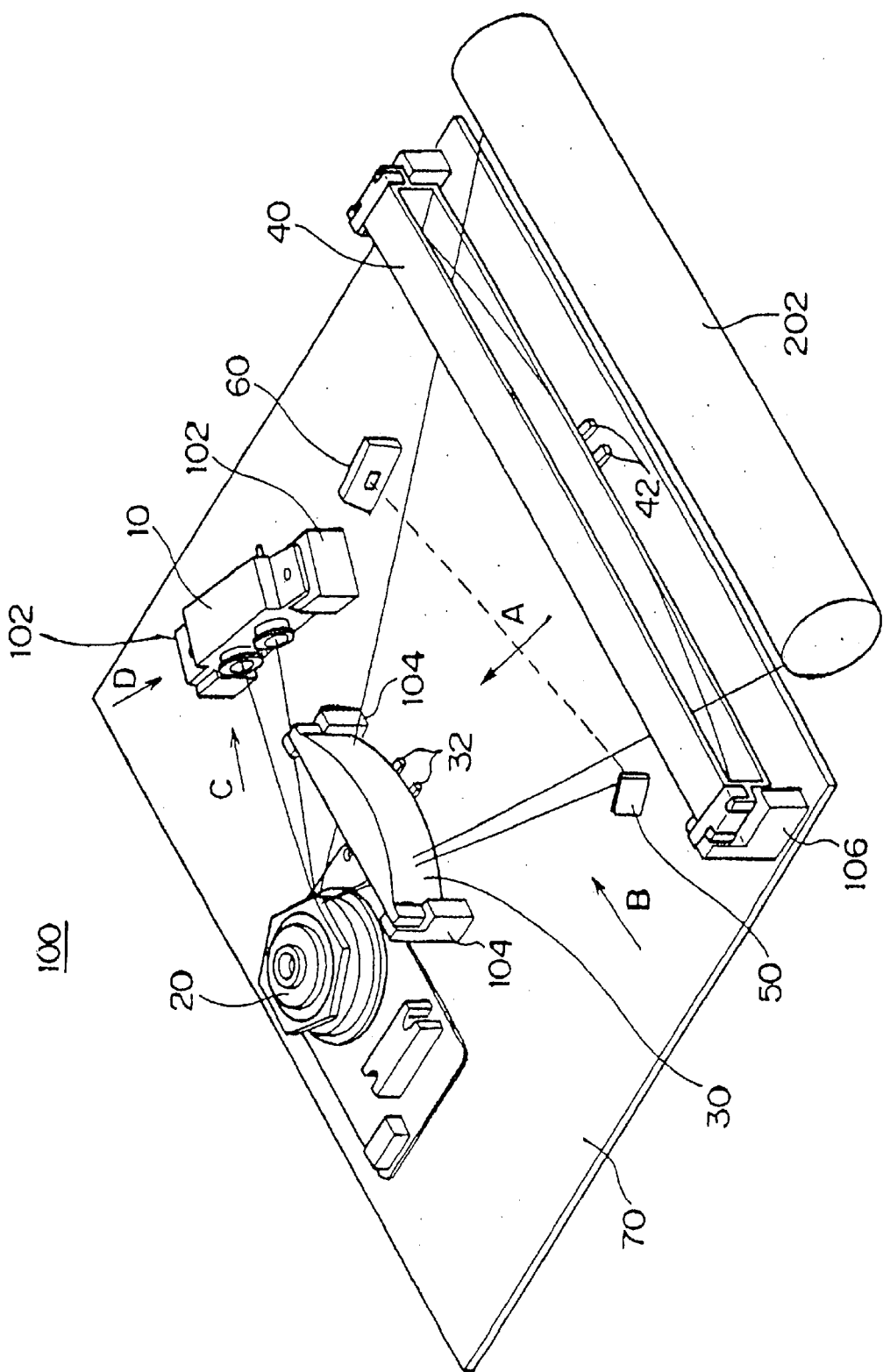
FIG. 1 is a perspective overview of one exemplified embodiment of an optical unit according to the present invention.
Figure 2:
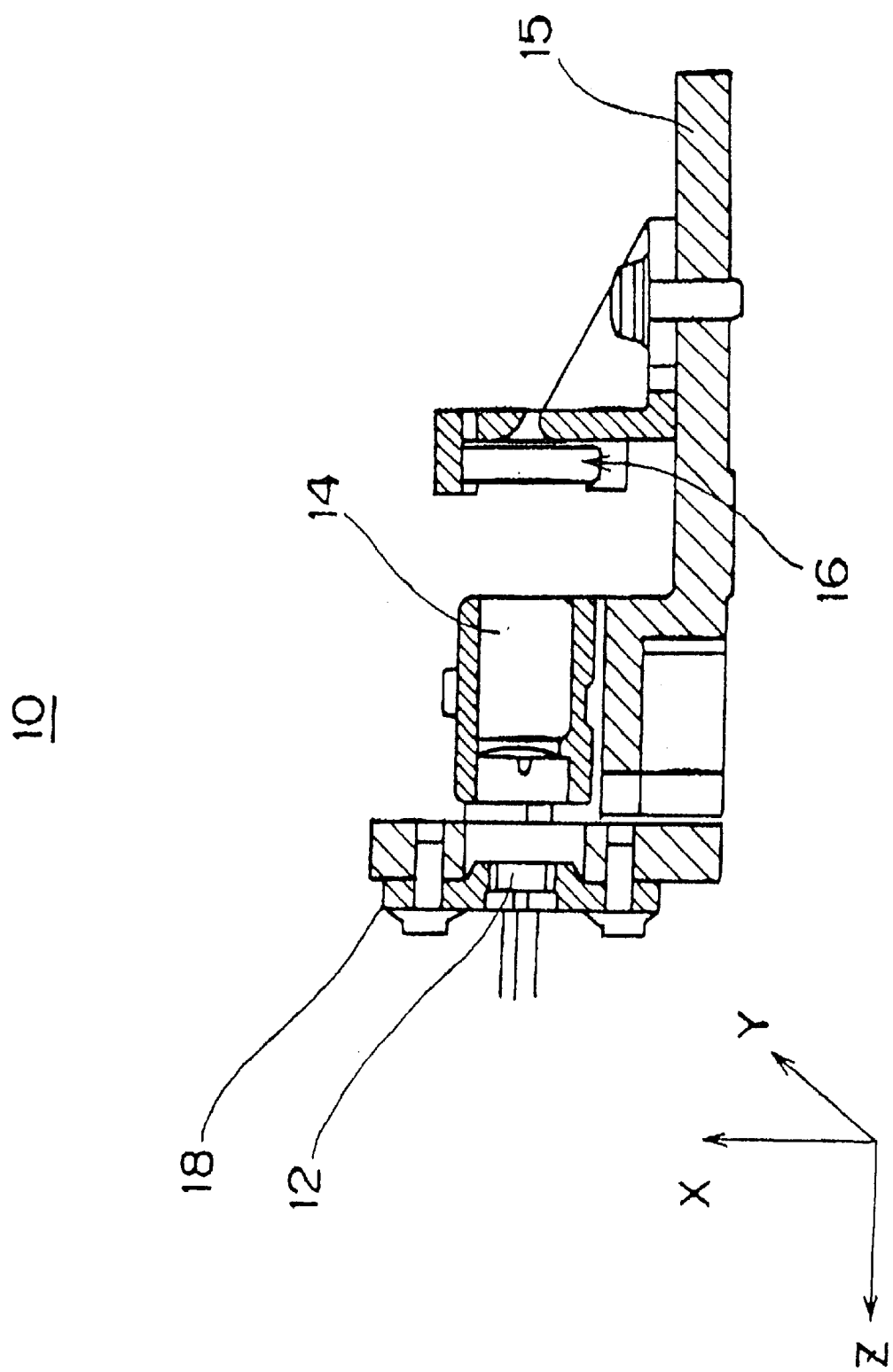
FIG. 2 is a magnified sectional view of a light source section used in a light source unit shown in FIG. 1.
Figure 3:
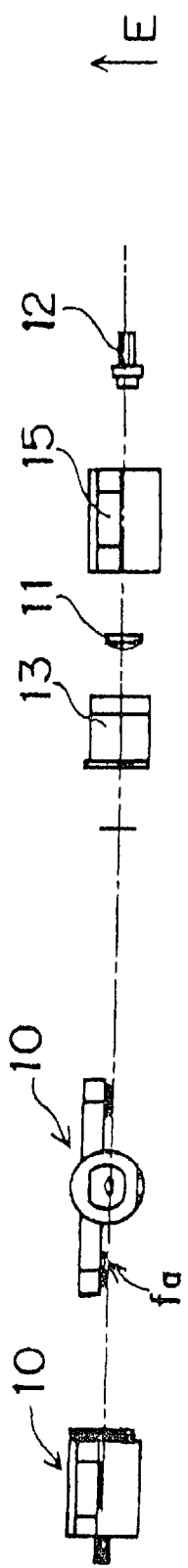
FIG. 3 is a front view, side view, and exploded side view of the light source section as viewed from a direction C in FIG. 1.
Figure 4:
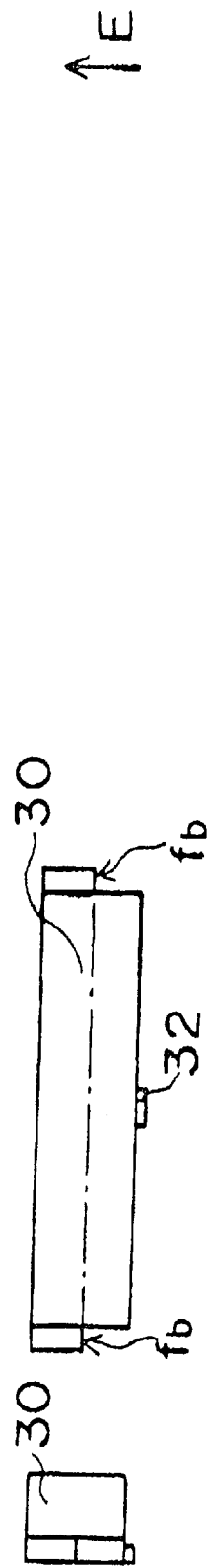
FIG. 4 is a front view of an f-è lens as viewed from a direction A in FIG. 1.
Figure 5:
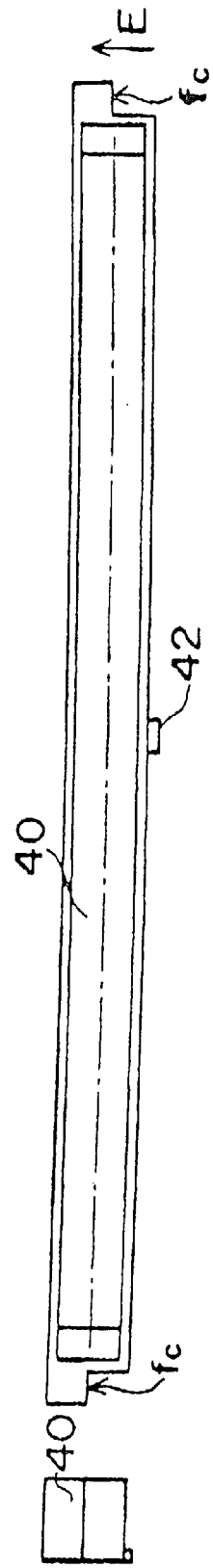
FIG. 5 is a front view of a cylinder lens as viewed from the direction A in FIG. 1.

A description will now be given of an optical unit 100 as one exemplified embodiment of the present invention, with reference to FIGS. 1 to 5 inclusive. FIG. 1 is a perspective overview of the optical unit 100. FIG. 2 is a schematic sectional view for showing a structure of a light source section 10. FIG. 3 is a front view, side view, and exploded side view of the light source section 10 as viewed from a direction C in FIG. 1. FIG. 4 is a front view of an f-è lens 30 as viewed from a direction A in FIG. 1. FIG. 5 is a front view of a cylinder lens as viewed from the direction A in FIG. 1.

Referring now to FIG. 1, the optical unit 100 comprises a light source section 10, an f-è lens 30, a cylinder lens 40, a folding mirror 50, a BD sensor 60, and an optical box (housing or base) 70.

The light source section 10 includes two laser light sources (i.e., exhibiting two-beam structure). Generally, the more light sources are provided, the more an image density and image-forming speed increase, so that high-definition images may be rapidly formed. Since the number of revolutions in a motor has technical limitations, the use of plural light sources is effective. The present embodiment uses a semiconductor laser 12 as the light source, but instead may use various light sources including a gas laser, an Ar laser, and the like. A different kind of light source has a different light-emission wavelength and luminosity. The laser beam irradiated by the light source has a wavelength ranging, for instance, from 400 nm through 900 nm.

The light source section 10, as shown in FIG. 3, includes a semiconductor laser 12, a collimating lens 11, a lens barrel 13, and a block 15. The collimating lens 11 and the lens barrel 13 may be regarded as a collimator section 14. Alternatively, as shown in FIG. 2, the light source section 10 may include a semiconductor laser 12, a collimator section 14, a beam shaping system 16, and a temperature control system 18.

The semiconductor laser 12 has good cost efficiency and maintainability, and can act as an optical switch. The collimator section 14 is a member for collimating a dispersing or focusing laser beam. The collimator section 14 includes a collimating lens 11, a cylindrical lens barrel 13, a block 15, and an adhesive 17, as shown in FIG. 3. The collimating lens 11, for instance, having an outer diameter of 6.37 mm, collimates a laser beam. The collimating lens 11 partly bonded and secured, preferably at a single spot, onto an inner surface of the lens barrel 13 with the adhesive 17. The term "partly" is used for the purpose of excluding a structure in which the collimating lens 11 is bonded on the lens barrel 13 by applying the adhesive 17 even only at a single spot but on an entire surface of the circumference of the collimating lens 11.

An efficient collimation requires a proper adjustment of a relative position between the semiconductor laser 12 and the collimating lens 11. It is therefore necessary to adjust the relative position between an emission point of the semiconductor laser 12 and the collimating lens 11 in three-axis directions (x, y, z). The three axes, as shown in FIG. 2, indicate the following directions respectively: the x-axis lies in the main scanning direction of the polygon mirror 30; the y-axis in the sub-scanning direction of the polygon mirror 30; and the z-axis the optical-axis direction of the laser beam from the light source section 10.

The lens barrel 13 holds the collimating lens 11 via the adhesive 17, and blocks an incidence of extraneous light to the lens 11. As described above, the collimating lens 11 is bonded at a single spot onto the inner surface of the lens barrel 13 via the adhesive 17. The adhesives 17 usable for bonding the collimating lens 11 and the lens barrel 13, in general, may include resinous adhesives such as silicon and epoxy, and an ultraviolet cure adhesive.

The optical unit 100, if applied to a laser printer, may have varied temperature, for instance, from 20° C. at an initial state to 60° C. during operation. Consequently, the adhesive 17 may thermally expand, and displace a stationary position of the collimating lens 11. Therefore, the bonding spot is preferably aligned with the axis x in the main scanning direction, or placed within specific tolerance worked out by the present inventors, et al. (e.g., ±30° with respect to the main scanning direction, preferably within ±11.5° if an acceptable pitch variation between beams is set to be 3 ìm or below). Accordingly, even the thermal expansion of the adhesive 17 due to the temperature rise in the optical unit 100 may cause the collimating lens 11 to move mainly in the main scanning direction x, but to be displaced only by a limited quantity in the sub-scanning direction, thereby preventing disabled printing operation or deteriorated image quality.

The block 15 is connected with a mounting part 102 at a specified mounting position (mounting surface $f_a$), and mounts the lens barrel 13 via the mounting part 102 onto the optical box 70 in the optical unit 100. The "specified mounting position" at which the block 15 is coupled with the mounting part 102 is, as shown in FIGS. 1 and 3, a mounting surface $f_a$ that is substantially aligned with an optical axis OA1 of the collimating lens 11. The block 15 is made, for example, of aluminum. The term "substantially aligned" means that a margin of error in position between the mounting position and the optical axis OA1 (i.e., displacement in the direction E or sub-scanning direction) is within a range that the collimating lens 11 can accommodate, or within a range that the BD sensor 60, which will be described later, can detect a beam. This structure allows the collimating lens 11 to keep the optical axis OA1, which has been aligned with the mounting position, from being shifted from an original position thereof (i.e., an initial position of the optical axis OA1 before thermal expansion) if the coefficient of thermal expansion in the mounting part is substantially low because the collimating lens 11 could thermally expand to a larger extent mainly above the mounting position. Consequently, disabled printing operation or deteriorated image quality caused by the unfavorably shifted optical axis may be prevented. The mounting position shown in FIG. 3 may be disposed at only one side of the right and left sides of the collimating lens 11.

The beam shaping system 16 includes, for instance, a cylinder lens, and held by a member slidable in a direction of the z-axis. The cylinder lens may converge a laser beam that has been collimated into a parallel beam through the collimating lens 11, to make the laser beam adjusted as desired with respect of the optical axis direction z and the main scanning direction x.

The temperature control system 18 includes, for instance, a heat sink, and disposed so as to be in contact with the semiconductor laser 12. The heat sink serves to eliminate heat produced in the semiconductor laser 12. Since any structures known in the art may be used for the semiconductor laser 12 and the heat sink, a detailed description will be omitted herein. The semiconductor laser 12 and the heat sink may be sold in a unit. The light source section 10 is placed under control of a controller (not shown) that may generally be embodied as a control board. The controller may generate a print signal as a pulse signal that drives the semiconductor laser 12, but is regarded as one of the heat sources in the optical unit 100.

The polygon mirror 20, which is a deflector taking on a rotary polyhedron mirror, includes a regular hexagonal plate and six mirrors around a circumference thereof as shown in FIG. 1, and rotates at tens of thousands of rpm with a spindle motor (not shown). The polygon mirror 20 is a mirror that waggles the beam emitted from the light source section 10 in the main scanning direction. The spindle motor is one of the heat sources in the optical unit 100.

The f-è lens 30 is provided to correct a deflection aberration that generates at both edges of a scanned surface. The cylinder lens 40 corrects a surface tilt of the beams emitted from the light source section 10. The f-è lens 30 and the cylinder lens 40 are secured in the optical box 70 respectively via the mounting parts 104 and 106. These two lenses (referred to as "scanning lens" in some instances) 30 and 40 may serve to form a distortion-free latent image on the photosensitive drum 202. To be specific, the collimated beam with constant angular velocity deflected by the polygon mirror 20 is converted via the f-è lens 30 into a converged spotlight with constant linear velocity. Thereafter, the spotlight passes through the cylinder lens 40, and reduces a pitch variation in scanning lines by a surface tilt error generated in the polygon mirror 30. The beam corrected as described above can scan a scanning surface on the photosensitive drum 202 with high precision.

The f-è lens 30 and the cylinder lens 40 would also result in disabled printing operation or deteriorated image quality like the collimating lens 11, if the lenses 30 and 40 thermally expanded and each optical axis were shifted in the sub-scanning direction. Therefore, the lenses 30 and 40 are connected with the mounting parts 104 and 106 at specified mounting positions (mounting surfaces $f_b$ and $f_c$). The "specified mounting positions" are, as shown in FIGS. 4 and 5, the mounting surfaces $f_b$ and $f_c$ that are substantially aligned with respective optical axes OA2 and OA3 of the lenses 30 and 40. The term "substantially aligned" means that a margin of error in position between each mounting position and each optical axis OA2 and OA3 (i.e., displacement in the direction E or sub-scanning direction) is within a range that each lens can accommodate, or within a range that the BD sensor 60, which will be described later, can detect a beam. This structure allows the lenses 30 and 40 to keep each optical axis OA2 and OA3, which has been aligned with each mounting position, from being shifted from an original position thereof (i.e., an initial position of each optical axis OA2 and OA3 before thermal expansion) if the coefficient of thermal expansion in the mounting parts is substantially low because the lenses 30 and 40 could thermally expand to a larger extent mainly above the mounting positions. Consequently, disabled printing operation or deteriorated image quality caused by the unfavorably shifted optical axis may be prevented. The mounting positions shown in FIGS. 4 and 5 may be disposed at only one side of the right and left sides of each lens 30 and 40.

Figure 6:
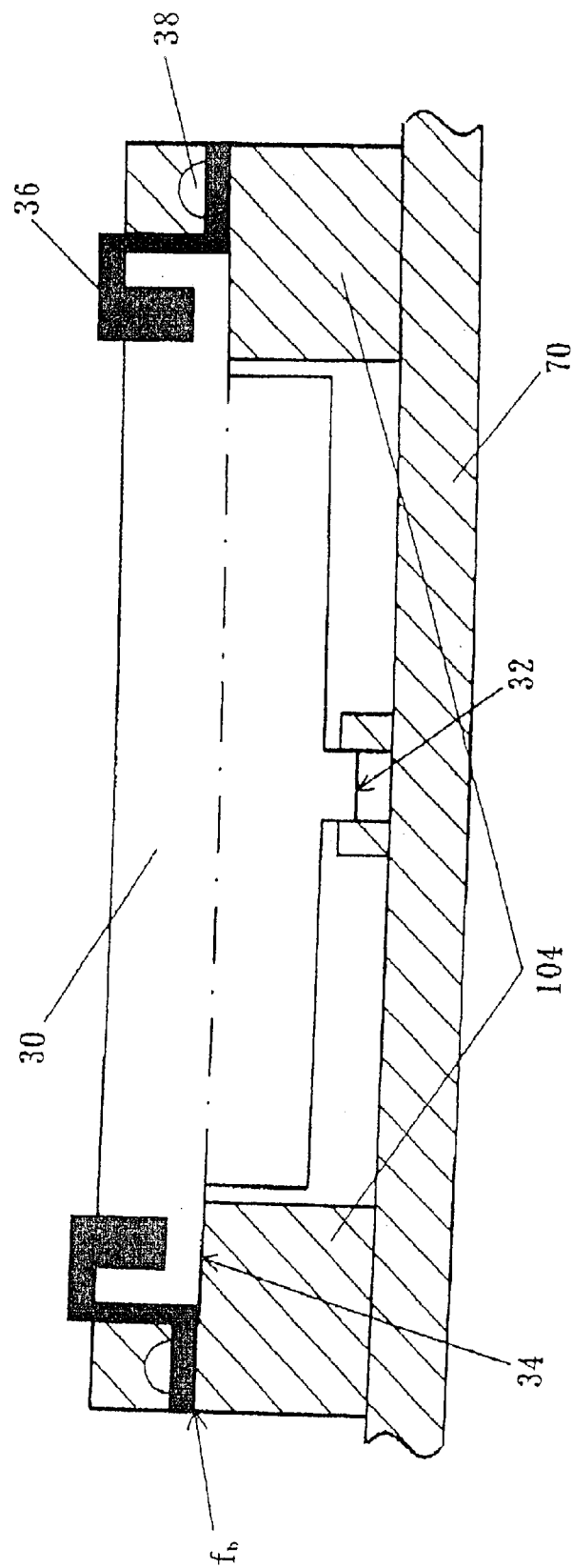
FIG. 6 is a schematic sectional view for showing a mounting state of the f-è lens in the optical unit as viewed from the direction A in FIG. 1.
Figure 7:
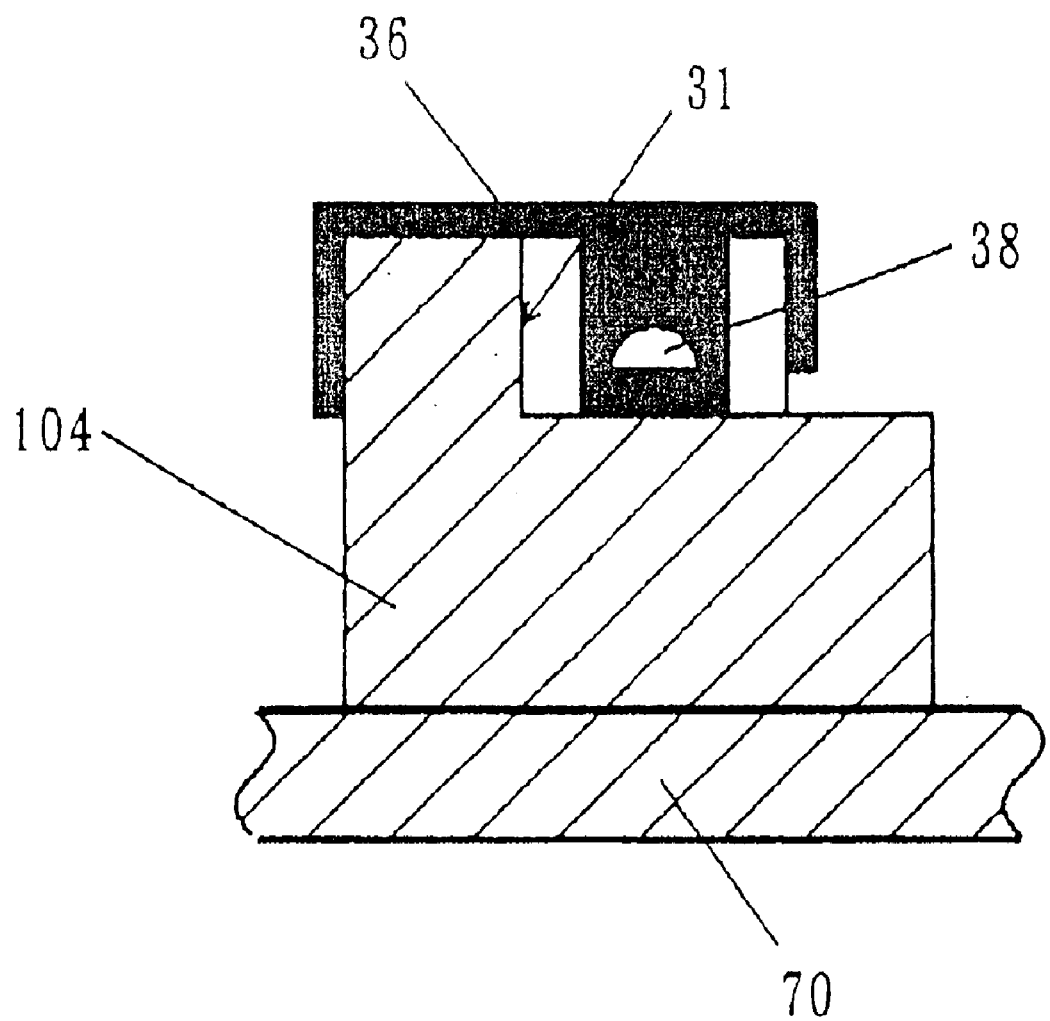
FIG. 7 is a schematic sectional view for showing a mounting state of the f-è lens as viewed from the direction C in FIG. 1.

A further detailed description will be given of a method of mounting the scanning lenses 30 and 40, with reference to FIGS. 6 and 7. FIG. 6 is a schematic sectional view for showing a mounting state of the f-è lens 30 as viewed from the direction A in FIG. 1. FIG. 7 is a schematic sectional view for showing a mounting state of the f-è lens 30 as viewed from the direction C in FIG. 1. As shown in FIG. 6, the f-è lens 30 includes a main scanning direction mounting part 32 and a sub-scanning direction mounting part 34. The main scanning direction mounting part 32, which has a downwardly convexed shape, may be fitted in a concaved portion formed in the optical box 70, and connected with the optical box 70. In that event, the connected portion is provided with space for accommodating a thermal expansion of the f-è lens 30. The sub-scanning direction mounting part 34, which has a mounting surface $f_b$ located along an extending line of the optical axis, may be placed on the right and left mounting parts 104, and fastened on the mounting parts 104 with leaf springs 36 and screws 38. As described above, the mounting surface $f_b$ is aligned with the optical axis OA2. FIG. 7 shows a mounting part 31 for fastening the f-è lens 30 in a direction toward a depth thereof. The mounting part 31 may check the depth while being mounted on the mounting part 104 so that the optical axis and the mounting surface $f_b$ may be neatly aligned with each other. Although the leaf springs 36 and screws 38 are used in the present embodiment, usable means for mounting the f-è lens 30 is not limited thereto, but an adhesive may be used for fastening the f-è lens 30.

In the method of mounting the optical unit 100, the mounting parts 102 through 106 each having the same height are prepared first. Next, the light source section 10, the f-è lens 30, and the cylinder lens 40 are respectively formed with mounting surfaces $f_a$ through $f_c$, that may be aligned with each optical axis in the sub-scanning direction. The light source section 10 and the mounting part 102 are connected via a leaf spring at the mounting surface $f_a$, and fastened onto the optical box 70. The cylinder lens 40 and the mounting part 106 are connected via a leaf spring at the mounting surface $f_c$ and fastened onto the optical box 70. In this manner, the present mounting method provides a precise positioning only in the sub-scanning direction, and a positioning by simply fitting a convex into a concave in the main scanning direction. This is because the misalignement in the main scanning direction may be corrected using the polygon mirror 20 and the BD sensor 60.

Figure 8:
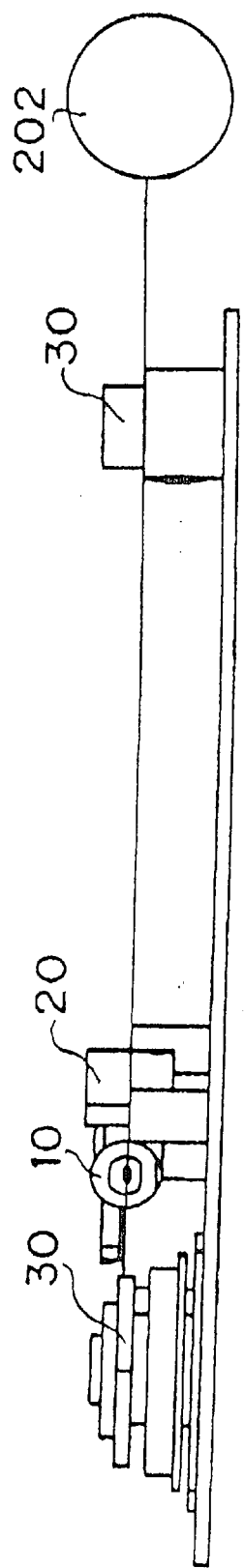
FIG. 8 is a sectional view of the optical unit as viewed from a direction B in FIG. 1.
Figure 13:
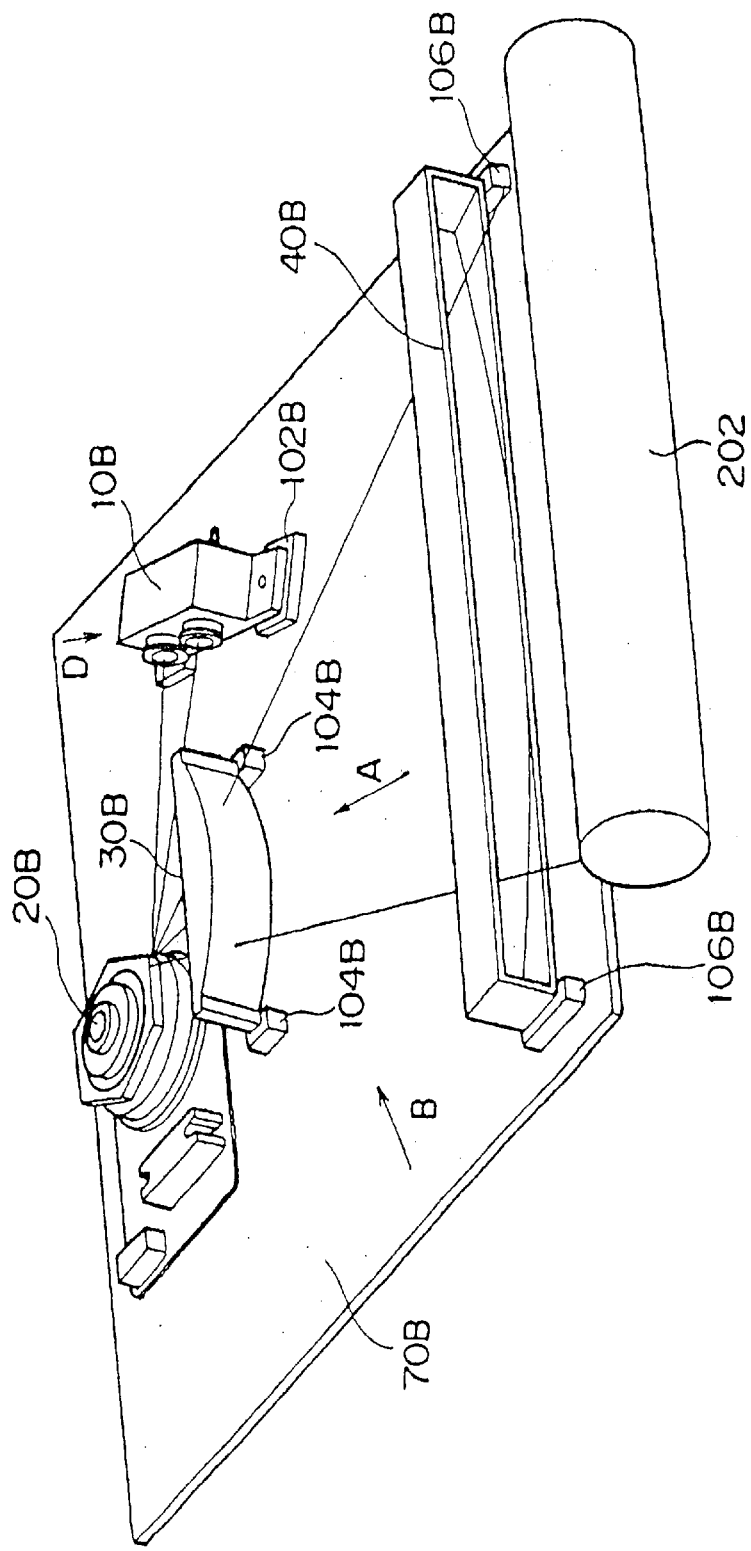
FIG. 13 is a perspective overview of an exemplified embodiment of a conventional two-beam type optical unit.
Figure 14:
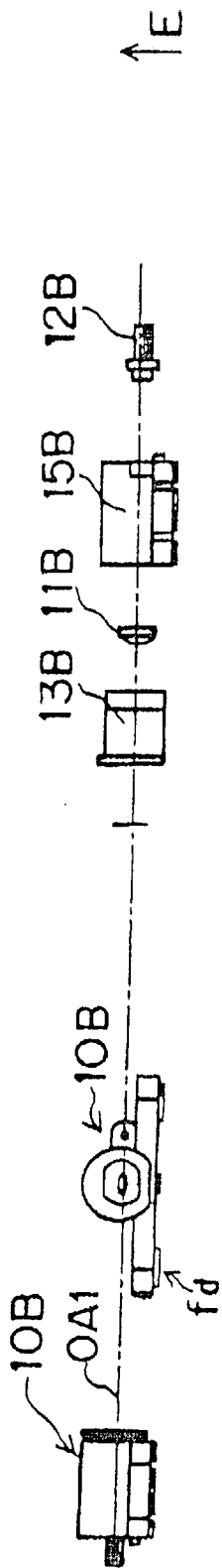
FIG. 14 is a front view, side view, and exploded side view of a light source as viewed from a direction C in FIG. 13.
Figure 15:
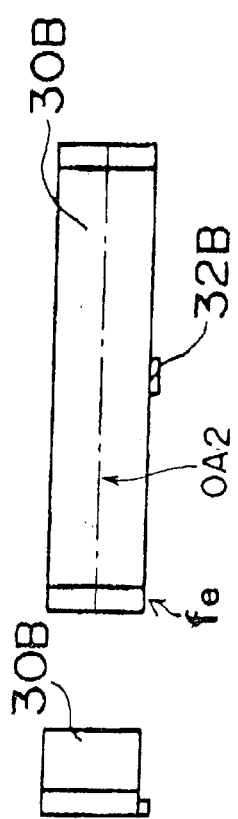
FIG. 15 is a front view of an f-è lens as viewed from a direction A in FIG. 13.
Figure 16:
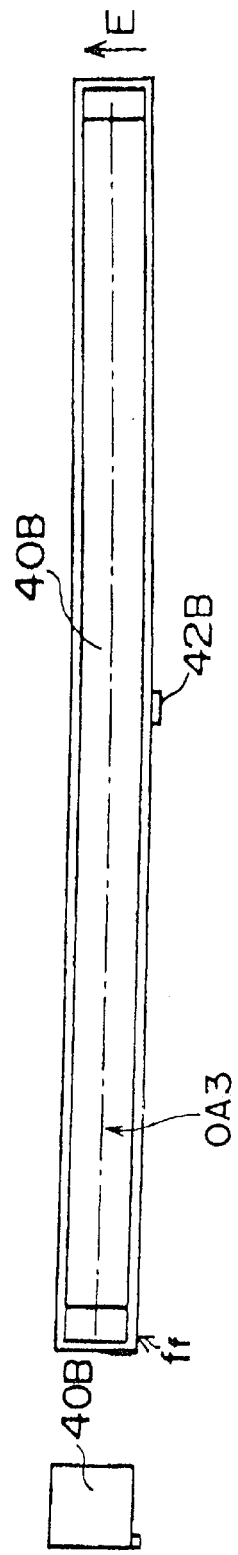
FIG. 16 is a front view of a cylinder lens as viewed from the direction A in FIG. 13.
Figure 17:
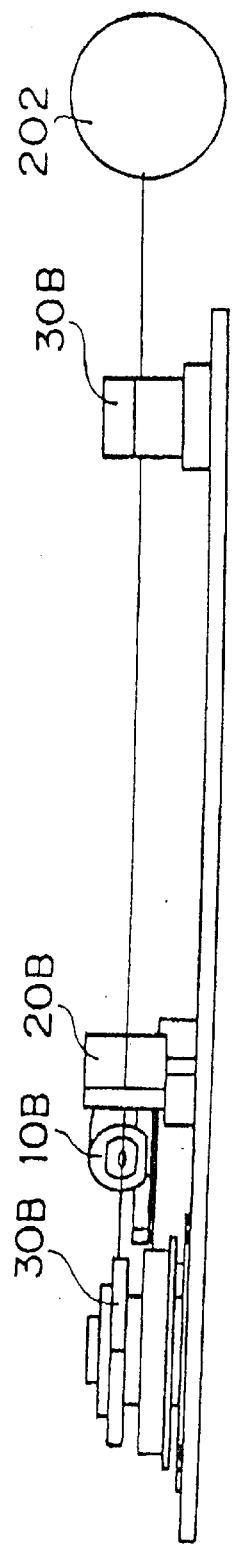
FIG. 17 is a sectional view of the optical unit of conventional type as viewed from a direction B in FIG. 13.
Figure 18:
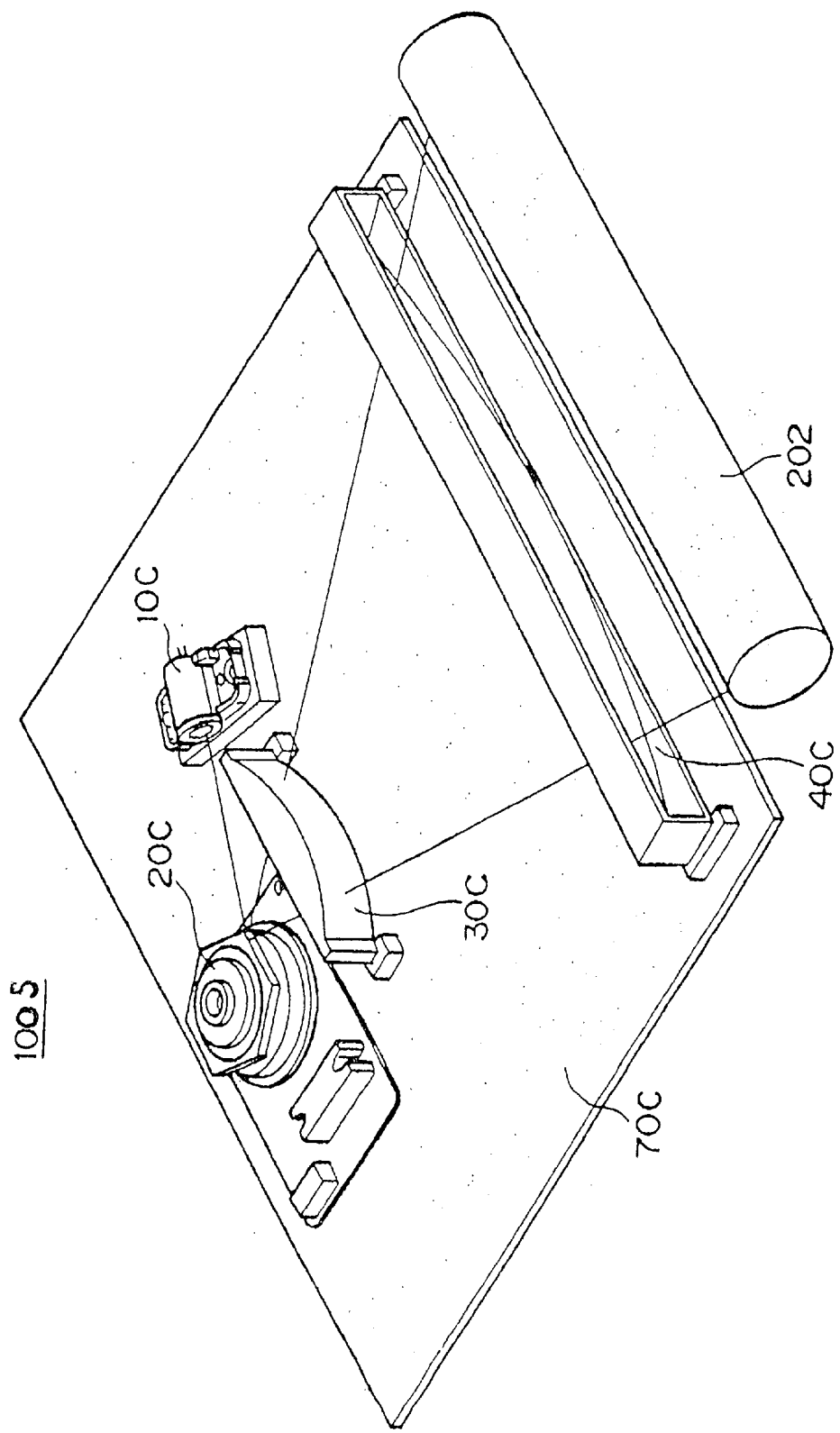
FIG. 18 is a perspective overview of an exemplified embodiment of a conventional one-beam type optical unit.
Figure 19:
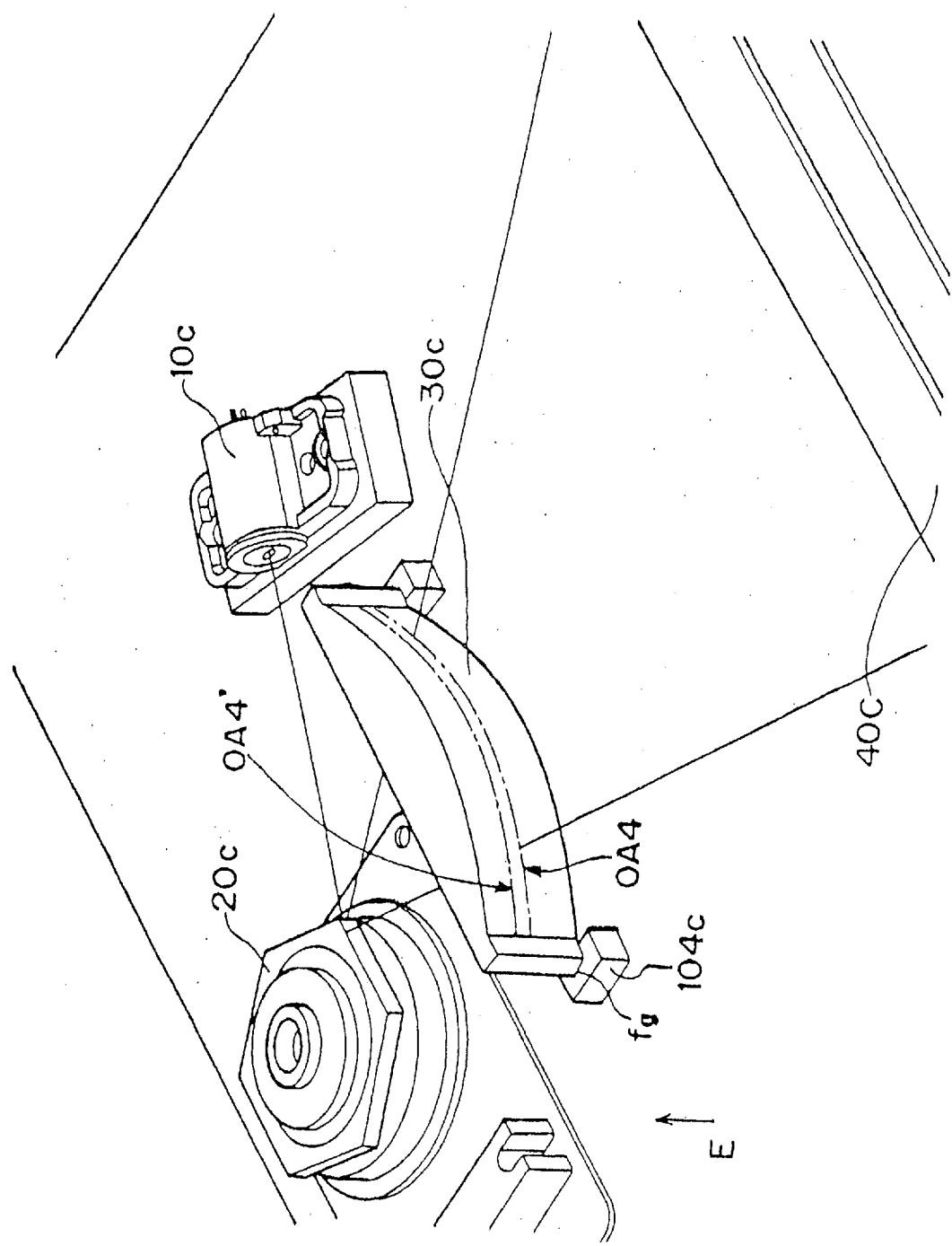
FIG. 19 is a partially enlarged perspective view of the optical unit shown in FIG. 18.

Referring next to FIGS. 8 and 17, a description will be given of a relationship of the heights of the mounting surfaces $f_a$ through $f_f$. FIG. 8 is a sectional view of the optical unit 100 as viewed from a direction B in FIG. 1, for explaining the relationship of the heights of the mounting surfaces $f_a$ through $f_c$. FIG. 17 is a sectional view of a conventional optical unit as viewed from a direction B in FIG. 13, for explaining the relationship of the heights of the mounting surfaces $f_d$ through $f_f$. The conventional mounting surfaces $f_d$ through $f_f$ vary in height, and thus also vary in thermal expansion amount; therefore, the optical axes supported by each mounting part become likely to be shifted. On the other hand, the mounting surfaces $f_a$ through $f_c$ have the same height as viewed from the optical box 70 in the inventive optical unit 100, and thus the mounting parts 102 through 106, if having the same material, have the same thermal expansion amount; thereby the shift of the optical axes OA1 through OA3 supported by each mounting parts 102 through 106 may be reduced or eliminated.

The folding mirror 50, which is located at an extremity of an area where the light reflected by the polygon mirror 20 may reach, reflects the laser light to the BD sensor (print start detector section) 60. The BD sensor 60 detects the laser beam reflected by the folding mirror 50, and a reference position for starting printing to provide timing of a print start. The BD sensor 60 is made of a photo diode, for instance. There is a controller, though not shown in FIG. 1, controlling this BD sensor 60. An operation of the optical unit 100 will be described when an operation of the electrophotographic recording device is described. The housing 70 accommodates each component of the optical unit 100.

The present invention may not preclude an application of any known technique for correcting a deviation in the main scanning direction. For example, Japanese Laid-Open Patent Application, Publication No. 9-76559 which was assigned to the instant assignee, disclosed a methodology of controlling light-emission timing from the laser light source 10 using a BD sensor 60, a delay circuit, and a laser light-emission timing creating circuit, and this methodology is applicable to the present invention. Alternatively, Japanese Laid-Open Patent Application, Publication No. 10-260368, which was also assigned to the present assignee, discloses a configuration of a beam shift device provided between the laser light source 10 and the polygon mirror 30, to shift the beams L1 and L2, and thereby correct a beam pitch. Further, the present invention may use a video clock signal generator for a laser printer disclosed in Japanese Laid-Open Patent Application, Publication No. 5-139950 which was also assigned to the present assignee. This generator includes a BD sensor 60, a sawtooth wave generator means for outputting a sawtooth wave with a prescribed frequency, a sampling means for sampling out the sawtooth wave when the BD sensor gives an output, and a comparator means for comparing the sampled value obtained by the sampling means with the sawtooth wave and for giving an output for a period when the sawtooth wave is larger than the sampled value. A pulse signal synchronous with the output of the comparator means is used for the video clock signal, whereby a synchronous accuracy between a laser scanning and the video clock signal is improved.

Figure 11:
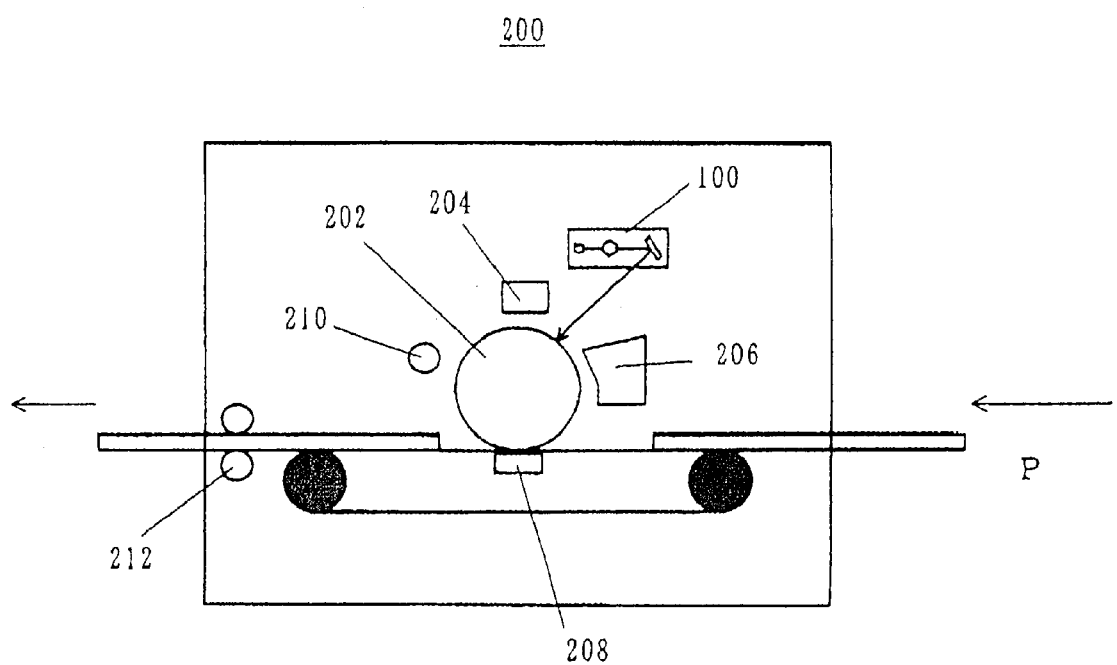
FIG. 11 is a schematic sectional block diagram of a principal part of a recording section in one exemplified embodiment of an electrophotographic recording device according to the present invention.
Figure 12:
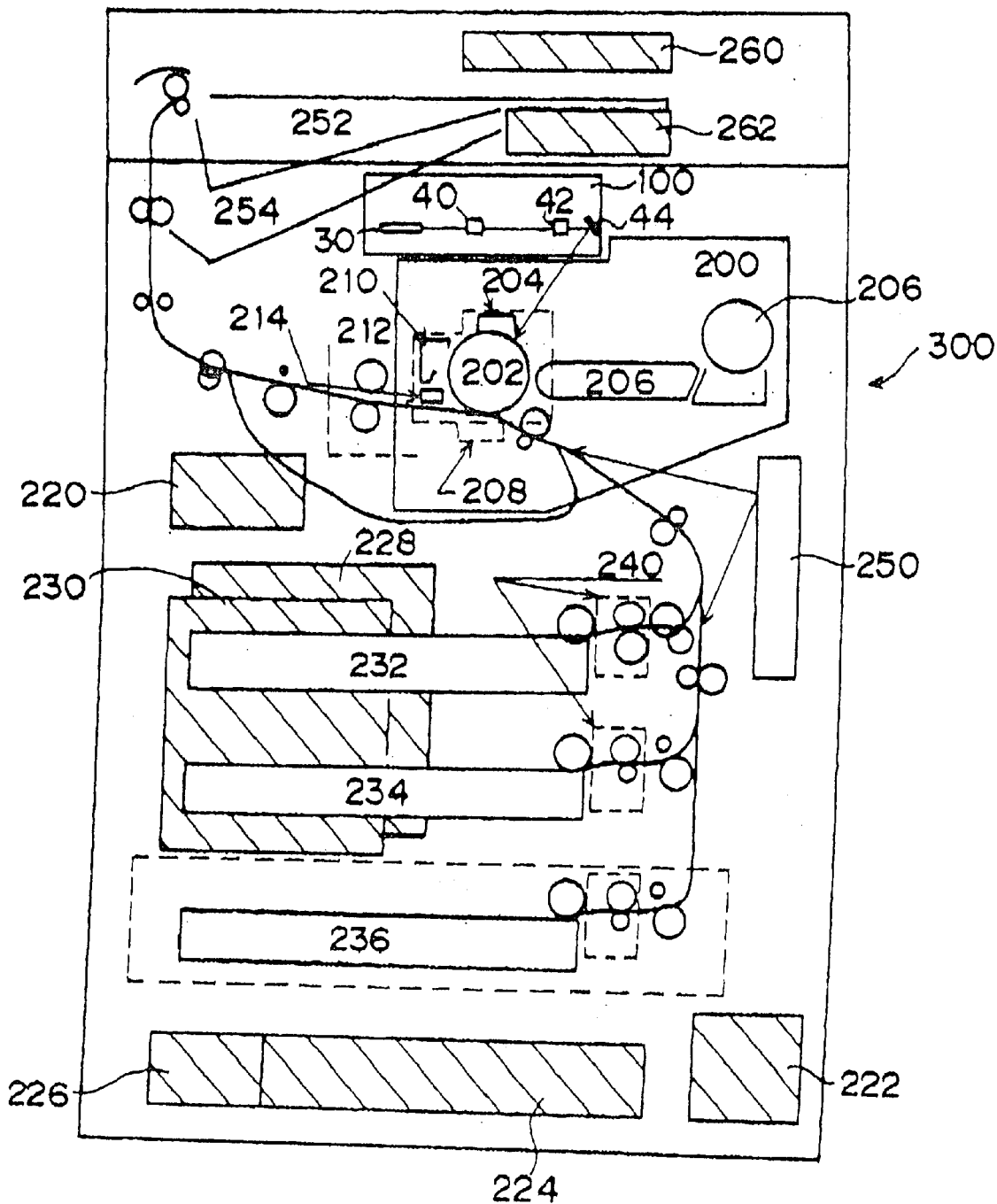
FIG. 12 is a schematic sectional block diagram of a principal part of a recording section in the electrophotographic recording device illustrated more in detail than in FIG. 11, including a sheet conveyor system, and other components.

A description will be given of the electrophotographic recording device 300 having the optical unit 100 and a recording section 200, with reference to FIGS. 11 and 12. FIG. 11 is a schematic sectional block diagram of an essential part of the recording section 200 in the electrophotographic recording device 300. FIG. 12 is a schematic sectional block diagram of an essential part of the electrophotographic recording device 300 including a sheet feeder system, etc. as more specifically illustrated than in FIG. 11.

The recording section 200 in the recording device 300 according to the present invention comprises a photosensitive drum 202, a charger 204, an optical unit 100, a development device 206, a transfer device 208, a cleaning section 210, a fixing device 212, a discharge lamp 214, and a print cartridge 216. A printing paper P is transferred from the right to the left in FIG. 11, and transferred upwardly from the bottom along an approximately S-shaped path.

The photosensitive drum 202 includes a photosensitized dielectric layer on a rotatable drum-shaped conductor support, and used for an image holding member. For instance, the photosensitive drum 202 is made by applying a function separation-type organic photoreceptor with a thickness of about 20 im on a drum-shaped aluminum member, and rotates at a circumferential velocity of 70 mm/s to move in the arrow direction at a speed of 30 mm/s. The charger 204 is a scorotron electrifying device, which has a property of giving a constant amount of electric charges on the photosensitive drum 202. The photosensitive drum can thereby be charged on a surface thereof uniformly at about −700 V.

The optical unit 100, as described above, incorporates the semiconductor laser 12 as a light source 10, and the light in accordance with a document falls on the photosensitive drum 202 and exposure is performed on the photosensitive drum 202. The exposure neutralizes a potential on the photosensitive drum 202, and a latent image corresponding to an image data to be recorded is formed.

As shown in FIG. 12, the optical unit 100 is located in an upper portion in the electrophotographic recording device 300. Each unit is incorporated at a lower portion. These units include the recording section 200, a high-voltage power supply 220, a main power switch 222, a low-voltage power supply 224, a hard disk 226, a control unit 228, a main control unit 230, an upper hopper 232, a middle hopper 234, a lower hopper 236, a sheet feeder unit 240, and a sheet feeder section 250. Further, the recording device 300 includes an eject tray 252, a page tray 254, an operation panel 60, and a floppy disk drive 262. As any devices known in the art may be applied for these units, a detailed description will now be omitted. Each unit, when working, generates heat. In addition, the paper P, when printed, retains heat too. The heat adversely affects the optical unit 100. It goes without saying that the spindle motor and control board (not shown) in the optical unit 100 also generates heat as described above.

The development device 206 uses a developing agent, supplies to the photosensitive drum the developing agent or a fine charged particle supplied from a toner cartridge (not shown), and forms a toner image on the photosensitive drum 202 by an electrostatic force between the photosensitive drum 202 and the charged developing agent, visualizing the image. The toner may include one or two components (i.e., including a carrier). The transfer unit 208 includes a transfer roller (not shown), generates an electronic field to electrostatically adsorb the toner, and transfers the toner image adsorbed on the photosensitive drum 202 onto the printing paper P by utilizing a transfer current.

After the transfer, the cleaning section 210 collects and disposes of toner remaining on the photosensitive drum 202, or as necessary returns the collected toner to the toner cartridge (not shown). The cleaning section 208 also serves to prevent charged debris of paper or the like other than toner from bringing a detrimental effect on a charged state of toner and lowering its printing performance. The cleaning section 210 can utilize varied kinds of energy including magnetic force and rubber friction to remove the toner and charges on the photosensitive drum 202.

The fixing device 212 is for permanently fixing toner onto the paper P. The transferred toner is adhered onto the paper P with a weak force, and thus easily fallen off. Thus, the toner needs to be fixed by energy such as pressure and heat, and it is necessary to make solid toner into liquid toner in order to obtain a sufficient fixing performance. The added energy makes the solid toner semifluid, spread and penetrant, completing the fixture. The discharge lamp 214 eliminates charges on the printing paper.

In operation of the recording device 300 shown in FIG. 11, the photosensitive drum 202 carries a uniform negative charge (at about −700V) applied by the charger 204. When the laser beam is emitted from the optical unit 100 onto the photosensitive drum 202, part of the uniform charge on the photosensitive drum 202 corresponding to an image is eliminated by exposure to light with the laser beam, thereby forming a latent image.

To be more specific, as shown in FIG. 1, the laser beams emitted by the light source 10 comprised of the semiconductor laser 12 pass through the collimator section 14, and are thereby converted from diffusing beams to collimated beams. The collimated beams are reflected on the polygon mirror 30 as the scanning section. Subsequently, deflection aberrations in the laser beams are eliminated by the effect of the lens 30, and the laser beams go to the folding mirror 50. Then, the BD sensor 60 detects the laser beam, whereby a beam-emitting position is adjusted by the print start position. On the other hand, the beams that have passed through the cylinder lens 40 and corrected a surface tilt thereof are emitted from the reflecting mirror 50 onto the photosensitive drum 202 shown in FIGS. 11 and 12. Thereafter, the exposure ends, and a latent image is formed on the photosensitive drum 202.

Even if a temperature rise in the optical unit 100 by the foregoing reasons during an operation of the recording section 200 would displace the collimating lens, a displacing direction thereof is limited mainly to the main scanning direction, and therefore the polygon mirror 30 and the BD sensor 60 can catch the laser beams from the optical unit 100. As a result, the polygon mirror 30 reflects the laser beams, so a latent image is reliably formed on the photosensitive drum 202. The BD sensor 60 thus detects the laser beams, whereby a controller (not shown) in the recording device 200 can securely obtain the print timing.

Thereafter, the latent image is developed in the development device 206. To be more specific, a charged particle (or powder) of toner at about −50V is attracted to a discharged area on the photosensitive drum 202 by the electrostatic force. Consequently, the latent image on the photosensitive drum 202 is visualized as a toner image. The toner image is transferred onto a printing paper P conveyed in perfect timing. Resultantly, the toner image on the photosensitive drum 202 is adsorbed and deposited onto the printing paper P, and thus the toner image is transferred on the printing paper P. The cleaning section 60 collects remaining toner on the photosensitive drum 202. The toner on the printing paper P then passes in the fixing device 212, and thereby permanently fixed; thereafter the printing paper P is ejected out of the recording device 100.

Figure 9:
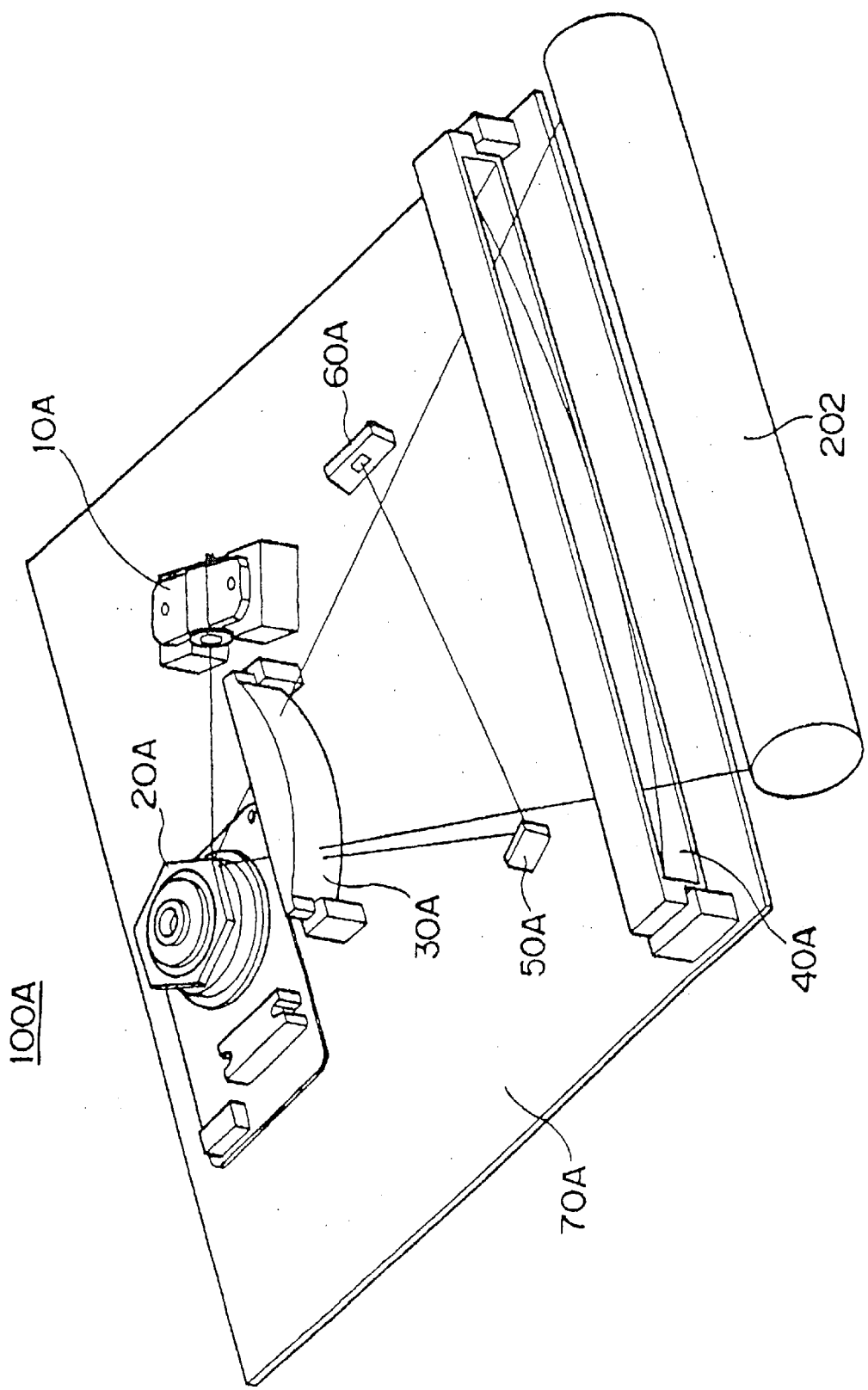
FIG. 9 is a perspective overview of another exemplified embodiment of the optical unit according to the present invention.
Figure 10:
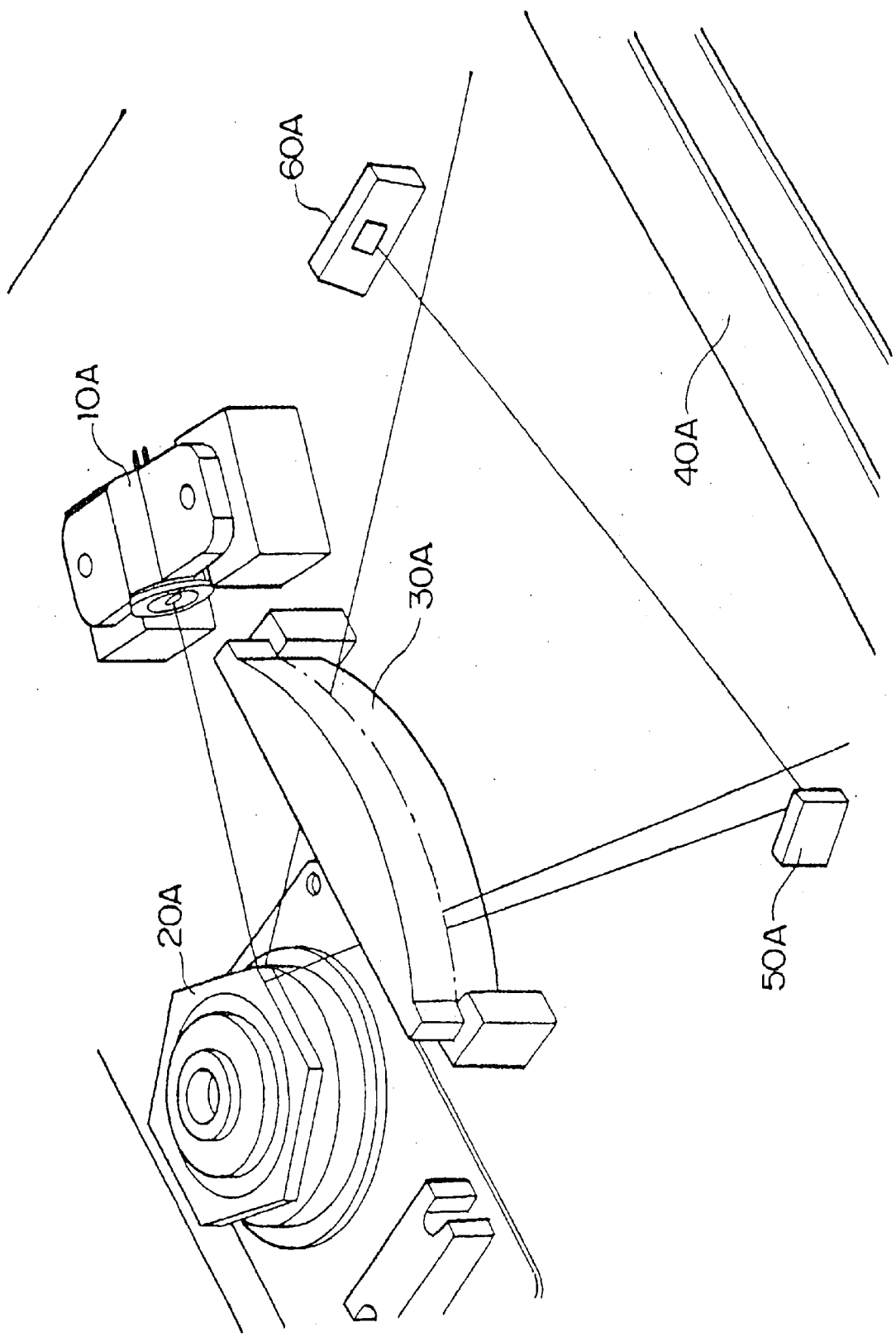
FIG. 10 is a magnified view of a principal part of the optical unit shown in FIG. 9.

The present embodiment is configured to use two laser light sources 10 in order to achieve a high-resolution and high-speed printing. Although the conventional increased displacement of the laser beam would disadvantageously make a contour of the latent image thick preventing a high-quality image from being formed, the present invention has solved this problem and provided the high-quality images successfully. On the other hand, as shown in FIGS. 9 and 10, the present invention is useful for an optical unit 100A using one light source section 10A. FIG. 9 is a schematic perspective view of another exemplified embodiment of the inventive optical unit 100A. FIG. 10 is a magnified view of an essential part of the optical unit 100A shown in FIG. 9.

As shown in FIG. 9, a structure in the unit 100A is the same as that in the unit 100 but a single provision of the semiconductor laser 12A. Alignment of a mounting surface with the optical axis as in FIG. 1 would make a deviation of the optical axis due to thermal expansion reduced. In case of one-beam configuration, if the light source section 10 and the f-è lens 30 is mounted in such a manner that the optical axis may not be shifted, the mounting surface $f_c$ of the cylinder lens 40 may be a bottom-side surface of the lens as is conventionally configured. Because, if the optical axis is not shifted when the laser beams has passed through the f-è lens 30, the laser beams has fallen precisely on the folding mirror 50, and thus the BD sensor 60 may detect the beam. Consequently, the exposure to light on the photosensitive drum 202 is initiated, and therefore an intended performance of latent image formation would be secured even if the mounting surface $f_c$ were the bottom-side surface of the lens as a conventional configuration.

Figure 20:
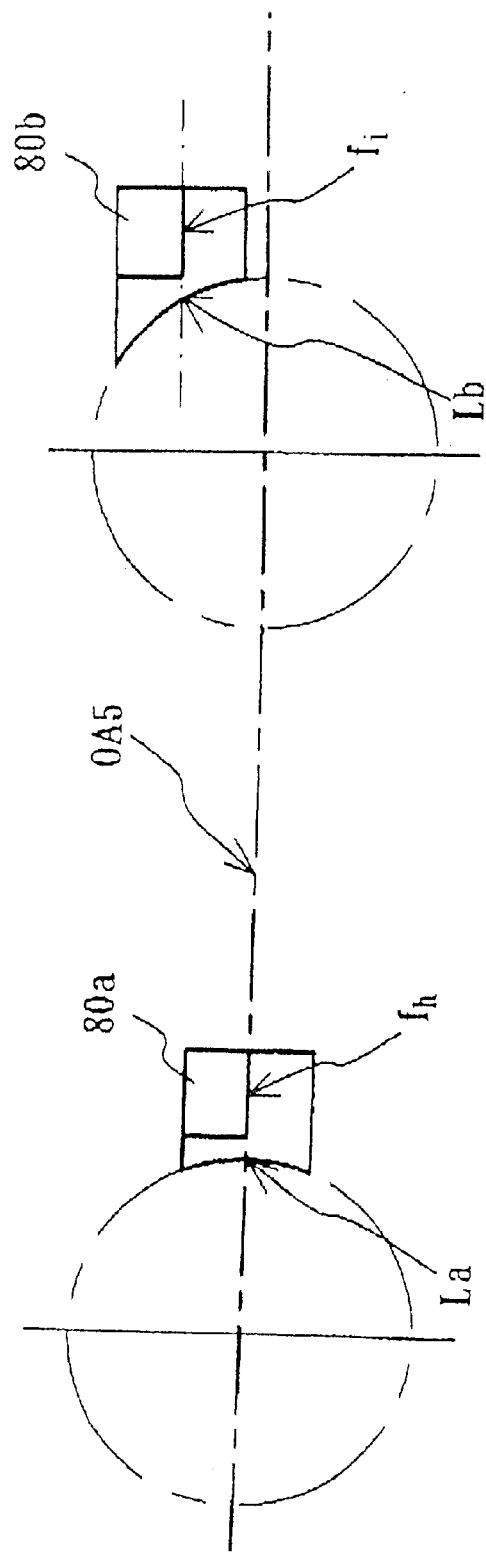
FIG. 20 is a schematic diagram for comparing a mounting method of a lens having symmetrical top and bottom surfaces with that of a lens having asymmetrical top and bottom surfaces.

In the instant embodiments, as described above, the explanation is based on the premise that the lenses have symmetrical top and bottom lens surfaces, but a description will now be given of a method of mounting a lens having asymmetrical top and bottom lens surfaces, with reference to FIG. 20. FIG. 20 is a schematic diagram for comparing the mounting method of a lens 80a having symmetrical top and bottom lens surfaces with that of a lens 80b having asymmetrical top and bottom lens surfaces. As shown in FIG. 20, the lens 80a has symmetrical top and bottom lens surfaces, and thus an optical axis OA5 in the sub-scanning direction as a curvature center of the lens is aligned with the beam $L_a$. Therefore, when a mounting surface $f_h$ is aligned or substantially aligned with the optical axis OA5, even if the lens 80b thermally expands, the beam $L_a$ and the optical axis OA5 are in good alignment with each other. However, since the lens 80b has asymmetrical top and bottom lens surfaces, the optical axis OA5 in the sub-scanning direction as a curvature center of the lens is not aligned with the beam $L_b$. Therefore, the lens 80b can make a deviation of the optical axis due to thermal expansion reduced by aligning the beam $L_b$ and a mounting surface $f_i$. In this manner, the present invention is suitable for the lens having asymmetrical top and bottom lens surfaces as well.

Although the preferred embodiments of the present invention have been described above, the present invention is, needless to say, not restricted to these embodiments, and it is to be understood that various modifications and changes may be made without departing from the spirit and scope thereof.

According to an optical unit and recording device having such an optical unit as one exemplified embodiment of the present invention, if temperature in the optical unit rises, displacement of the lenses do not occur in the sub-scanning direction in the optical unit to a great extent. Consequently, malfunctioning printing operation and image deterioration can be prevented without an expensive cooling device or correcting means in the sub-scanning direction.

What is claimed is:

1. An optical unit comprising:
   a base;
   at least one lens that is disposed on a light path of a beam emitted from a light source; and
   a mounting part that mounts said lens on said base,
   wherein a mounting position between said mounting part and said lens is substantially aligned with an optical axis in a sub-scanning direction of said lens.

2. An optical unit according to claim 1, wherein a margin of error in position between said mounting position and said optical axis in said sub-scanning direction is within a permissible range of said lens.

3. An optical unit comprising:
   a base;
   a collimating lens that collimates a beam from a light source;
   a scanning lens that corrects a curvature of said beam that has passed through said collimating lens; and
   a mounting part that mounts said collimating lens and said scanning lens on said base,
   wherein a mounting position between said mounting part and at least one of said collimating lens and said scanning lens is substantially aligned with an optical axis in a sub-scanning direction of said at least one lens.

4. An optical unit according to claim 3, wherein a margin of error in position between said mounting position and said optical axis in said sub-scanning direction is within a permissible range of said at least one lens.

5. An optical unit according to claim 3, further comprising a detector part that detects said beam that has passed through said scanning lens, wherein a margin of error in position between said mounting position and said optical axis in said sub-scanning direction is within a range within which said detector part can detect said beam.

6. An optical unit according to claim 3, wherein said scanning lens includes an f-è lens and a cylindrical lens, and said at least one lens is at least one of said f-è lens and said cylindrical lens.

7. An optical unit comprising:
   a base;
   a collimating lens that collimates a beam from a light source;
   a scanning lens that corrects a curvature of said beam that has passed through said collimating lens;
   a first mounting part that mounts said collimating lens on said base; and
   a second mounting part that mounts said scanning lens on said base,
   wherein a first mounting position between said first mounting part and said collimating lens, and a second mounting position between said second mounting part and said scanning lens are disposed in a place substantially equidistant from said base.

8. An optical unit according to claim 7, wherein said first mounting position is substantially aligned with an optical axis in a sub-scanning direction of said collimating lens.

9. An optical unit according to claim 7, wherein said second mounting position is substantially aligned with an optical axis in a sub-scanning direction of said scanning lens.

10. An optical unit according to claim 9, wherein said scanning lens is at least one of an f-è lens and a cylindrical lens.

11. An optical unit according to claim 7, further comprising a light source section including a light source and a collimating lens, and a third mounting part that mounts said light source section on said base,
    wherein a third mounting position between said third mounting part and said light source section, and said second mounting position between said second mounting part and said scanning lens are disposed in a place substantially equidistant from said base.

12. An optical unit according to claim 3, wherein said light source includes at least two beam sources, and said collimating lens and said scanning lens are respectively provided in the same number as that of the beam sources.

13. An optical unit according to claim 7, wherein said light source includes at least two beam sources, and said collimating lens and said scanning lens are respectively provided in the same number as that of the beam sources.

14. An electrophotographic recording device comprising:

a photosensitive body;

a pre-charger that electrifies said photosensitive body;

an optical unit that exposes said photosensitive body and forms a latent image thereon;

a development device that visualizes said latent image into a toner image with a developing agent;

a transfer device that transfers said toner image onto a recordable medium; and a fixing device that fixes said toner image on said recordable medium, wherein said optical unit includes:

a light source;

a base;

a collimating lens that collimates a beam from said light source;

a scanning lens that corrects a curvature of said beam that has passed through said collimating lens; and a mounting part that mounts said collimating lens and said scanning lens on said base; and wherein a mounting position between said mounting part and at least one of said collimating lens and said scanning lens is substantially aligned with an optical axis in a sub-scanning direction of said at least one lens.

15. An electrophotographic recording device comprising:

a photosensitive body;

a pre-charger that electrifies said photosensitive body;

an optical unit that exposes said photosensitive body and forms a latent image thereon;

a development device that visualizes said latent image into a toner image with a developing agent;

a transfer device that transfers said toner image onto a recordable medium; and a fixing device that fixes said toner image on said recordable medium, wherein said optical unit includes:

a light source;

a base;

a collimating lens that collimate a beam from a light source;

a scanning lens that corrects a curvature of said beam that has passed through said collimating lens;

a first mounting part that mounts said collimating lens on said base; and a second mounting part that mounts said scanning lens on said base; and wherein a first mounting position between said first mounting part and said collimating lens, and a second mounting position between said second mounting part and said scanning lens are disposed in a place substantially equidistant from said base.

16. An optical unit comprising:

a base;

at least one lens that is disposed on a light path of a beam emitted from a light source; and a mounting part that mounts said lens on said base, wherein a mounting position between said mounting part and said lens is substantially aligned with a position on said light path of said beam.

17. An optical unit according to claim 16, wherein said lens has asymmetrical top and bottom lens surfaces.

* * * * *

UNITED STATES PATENT AND TRADEMARK OFFICE
CERTIFICATE OF CORRECTION

PATENT NO.    : 6,411,325 B1
DATED         : June 25, 2002
INVENTOR(S)   : Matsushita et al.

It is certified that error appears in the above-identified patent and that said Letters Patent is hereby corrected as shown below:

<u>Title page,</u>
Item [75], Assignee, change "Fujitsu Limited Kawasaki (JP)" to be -- Fujitsu Limited, Kawasaki (JP) --

Signed and Sealed this

Twenty-ninth Day of July, 2003

JAMES E. ROGAN
*Director of the United States Patent and Trademark Office*